(12) United States Patent
Seki et al.

(10) Patent No.: US 7,119,863 B2
(45) Date of Patent: Oct. 10, 2006

(54) ELECTRO-OPTICAL DEVICE AND ELECTRONIC APPARATUS

(75) Inventors: Takumi Seki, Misato-mura (JP); Atsushi Kitagawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/677,487

(22) Filed: Oct. 3, 2003

(65) Prior Publication Data
US 2006/0050193 A1 Mar. 9, 2006

Related U.S. Application Data

(63) Continuation-in-part of application No. 10/657,151, filed on Sep. 9, 2003.

(30) Foreign Application Priority Data
Sep. 27, 2002 (JP) ............................. 2002-283626

(51) Int. Cl.
*G02F 1/1335* (2006.01)
(52) U.S. Cl. ........................................ 349/114; 349/44
(58) Field of Classification Search ................ 349/44, 349/110–111, 114
See application file for complete search history.

(56) References Cited

U.S. PATENT DOCUMENTS 5,708,486 A * 1/1998 Miyawaki et al. ............ 349/44

6,608,660 B1 * 8/2003 Okamoto et al. ............ 349/113
6,654,076 B1 * 11/2003 Ha et al. ........................ 349/43

FOREIGN PATENT DOCUMENTS

| JP | A 5-257168 | 10/1993 |
| JP | A 7-128658 | 5/1995 |
| JP | A 8-201773 | 8/1996 |
| JP | A 9-127497 | 5/1997 |
| JP | A 2000-298290 | 10/2000 |
| JP | A 2001-318377 | 11/2001 |
| KR | 2001-0025955 | 4/2001 |

* cited by examiner

*Primary Examiner*—Toan Ton
(74) *Attorney, Agent, or Firm*—Oliff & Berridge PLC

(57) ABSTRACT

The invention provides an electro-optical device having a light-shielding layer for preventing light from entering semiconductor elements. In particular, a liquid crystal display device of the present invention includes an electro-optical material between an element substrate having pixel electrodes and an opposing substrate facing the element substrate. The element substrate includes semiconductor elements for driving the pixel electrodes, insulation films covering the semiconductor element, and a reflective plate disposed on the insulation films, the reflective plate having openings. The semiconductor elements adjacent to the element substrate includes a light-shielding layer for shielding the semiconductor element from incident light, the light-shielding layer having openings in substantially the same regions as the openings in the reflective plate.

3 Claims, 6 Drawing Sheets

ELECTRO-OPTICAL DEVICE AND ELECTRONIC APPARATUS

This is a Continuation-in-Part of application Ser. No. 10/657,151 filed Sep. 9, 2003. The entire disclosure of the prior application is hereby incorporated by reference herein in its entirety.

BACKGROUND OF THE INVENTION

1. Field of Invention

The present invention relates to electro-optical devices and electronic apparatuses including such electro-optical devices. In particular, the present invention relates to a semi-transmissive reflective electro-optical device including a substrate provided with a reflective plate on the inner surface of the substrate.

2. Description of Related Art

An active matrix display device is known as an electro-optical device, such as a liquid crystal display device, that includes an electro-optical material, such as liquid crystal, disposed between a pair of substrates. In such an active matrix display device, a matrix of pixel electrodes is formed on one of the substrates and is energized through thin film transistor (TFT) elements for switching the display. In such a display device using TFT elements, when light is incident on a channel region of a TFT element, light leakage is caused. This leads to a display having defects, for example, low contrast and flicker. Japanese Unexamined Patent Application Publication No. 2000-298290, for example, discloses a technique that prevents light from entering the channel regions of the TFT elements by forming, for example, light-shielding films on the light incident surfaces of the TFT elements.

Another known active matrix display device is a semi-transmissive reflective display device in which a reflective plate having openings is formed on an element substrate having TFT elements thereon. The reflective plate reflects light incident on an opposing substrate to allow reflective display. The semi-transmissive reflective display device also allows transmissive display by transmitting through the openings light emitted from a light source disposed adjacent to the outer surface of the element substrate. Since the incident light on the channel regions of the TFT elements generates light leakage that deteriorates the display quality, the semi-transmissive reflective display device is also provided with a light-shielding film adjacent to the light incident surfaces of the TFT elements.

In the above-mentioned technique, having the light-shielding film on the element substrate for preventing the light leakage in the TFT elements, the light-shielding film shields the TFT elements from light. To efficiently utilize this light-shielding film to the fullest extent, it is desirable for the film to have other functions. As disclosed in Japanese Unexamined Patent Application Publication No. 09-127497, when the light-shielding film is formed only in the TFT regions, the surface of the element substrate between the TFT regions and non-TFT regions becomes irregular. The distance between the two substrates thus becomes uneven over these regions and leads to uneven retardation values. The structure in Japanese Unexamined Patent Application Publication No. 2000-298290, in which a light-shielding film is provided on the top surface of the TFT element substrate adjacent to the liquid crystal, is not applicable to a semi-transmissive reflective display panel. The structure in Japanese Unexamined Patent Application Publication No. 07-128658, in which a light-shielding film is provided on a source line, is also not applicable to the semi-transmissive reflective display panel.

SUMMARY OF THE INVENTION

An object of the present invention is to provide a semi-transmissive reflective electro-optical device that efficiently utilizes a light-shielding layer that prevents entry of light into semiconductor elements, such as TFT elements. Another object of the present invention is to prevent various problems caused in the formation of a light-shielding layer in the electro-optical device. Another object is to provide an electronic apparatus having such an electro-optical device.

To solve the above-mentioned problems, an electro-optical device of the present invention can include an electro-optical material disposed between an element substrate having pixel electrodes and an opposing substrate facing the element substrate. The element substrate includes semiconductor elements for driving the pixel electrodes, insulation films covering the semiconductor elements, and a reflective plate disposed on the insulation films, the reflective plate having openings. The semiconductor element adjacent to the element substrate includes a light-shielding layer for shielding the semiconductor elements from incident light, the light-shielding layer having openings in substantially the same regions as the openings in the reflective plate.

In such an electro-optical device, the light-shielding layer that shields the semiconductor elements from incident light has openings which are provided in substantially the same regions as the openings in the reflective plate. Thus, regions with the openings function as transmissive regions, whereas regions without the openings function as reflective regions. Compared with having the light-shielding layers only in the semiconductor element regions, the present invention can prevent unevenness of the distance between two substrates, which is caused in the formation of the light-shielding layer. In other words, the light-shielding layer is not partially formed in regions having different optical functions so as to prevent unevenness of the distance between two substrates caused in the formation of the light-shielding layer. Consequently, uniformity of, for example, the retardation values of each region is achieved.

In the fabrication of the semiconductor elements, after forming the light-shielding layer having openings on the substrate, a semiconductor layer is formed on the light-shielding layer with the insulation layer there between. If the semiconductor layer is annealed with light radiation of, for example, laser beam, the laser radiation may be performed from the side remote from the light-shielding layer. Thus, light incident on the light-shielding layer not absorbed by the semiconductor layer is reflected by the light-shielding layer to efficiently improve laser radiation. This facilitates, for example, the crystallization efficiency and also broadens the margin of the radiation energy.

Furthermore, compared with having the light-shielding layers only in the semiconductor element regions, relatively simple and rough positioning of the openings is permissible so as to simplify the patterning process during the formation of the light-shielding layer. A full-plate exposure unit, for example, may be used during the formation of the light-shielding layer to simplify the fabrication step. The alignment of the opening of the light-shielding layer and the opening of the reflective plate is designed to have an accuracy of about ±1 μm. In detail, the opening of the light-shielding layer is desirably formed larger than the opening of the reflective plate within the range of 1 μm.

In order to solve the problems, an electro-optical device according to another aspect of the present invention can include the electro-optical material disposed between the element substrate having pixel electrodes and the opposing substrate facing the element substrate, the element substrate including a light-shielding layer having openings, semiconductor elements disposed on a first insulation film on the light-shielding layer, a second insulation film covering the semiconductor elements, and a reflective plate disposed on the second insulation film, the reflective plate having openings in substantially the same regions as the openings in the light-shielding layer. Each opening region functions as a transmissive region for transmitting light from a light source provided near the outer surface of the element substrate, the light source being provided distant from the opposing substrate, and other non-opening regions function as reflective regions. The light-shielding layer prevents light emerging from the light source from entering the semiconductor elements.

Because the light-shielding layer is formed in the reflective regions and not in the transmissive regions, the light-shielding layer is not partially formed in each region so as to prevent unevenness of the distance between two substrates caused in the formation of the light-shielding layer. In the fabrication of the semiconductor element, after forming the light-shielding layer having openings on the substrate, the semiconductor layer is formed on the light-shielding layer with the insulation layer therebetween. If the semiconductor layer is annealed with light radiation of, for example, laser beam, the laser radiation may be performed from the side remote from the light-shielding layer. Thus, light incident on the light-shielding layer not absorbed by the semiconductor layer is reflected by the light-shielding layer to efficiently improve laser radiation. This facilitates, for example, the crystallization efficiency. Compared with having the light-shielding layer only in the semiconductor element regions, relatively simple and rough positioning of the openings is permissible. A full-plate exposure unit, for example, may be used during the formation of the light-shielding layer to simplify the fabrication step.

In the above electro-optical device, the light-shielding layer of a metallic material mainly composed of, for example, either titanium (Ti), tantalum (Ta), tungsten (W), molybdenum (Mo), or chromium (Cr) may be applied. Unlike the light-shielding layer being formed in only the semiconductor regions, the electro-optical device of the present invention has the light-shielding layer formed over a larger region of the substrate. Thus, when the light-shielding layer is mainly composed of a metallic material, the prevention of, for example, static electricity is improved compared with having the light-shielding layer only in a region in which the semiconductor element is formed. Accordingly, problems in the orientation of the electro-optical material caused by, for example, static electricity is prevented to achieve an improved operation of the electro-optical device. Here, the term mainly composed of can be referred to as a component with the highest content.

Each of the semiconductor element is coupled with a source line and a gate line, the source line being covered by the pixel electrode to avoid contact with the opening of the light-shielding layer. In such a case, the source line is usually a light-reflective metallic film composed of, for example, aluminum. By having the source line covered by the pixel electrode to avoid contact with the opening of the light-shielding layer, undesired light reflection in the source line is eliminated, whereby a formation of a black matrix is not necessary in the source line region.

An electronic apparatus of the present invention includes the above-mentioned electro-optical device as, for example, a display unit. By applying the liquid crystal device of the present invention, an electronic apparatus with high reliability and low defect rate is provided.

DETAILED DESCRIPTION OF PREFERRED EMBODIMENTS

Embodiments of the present invention will now be described with reference to the drawings.

Figure 1:
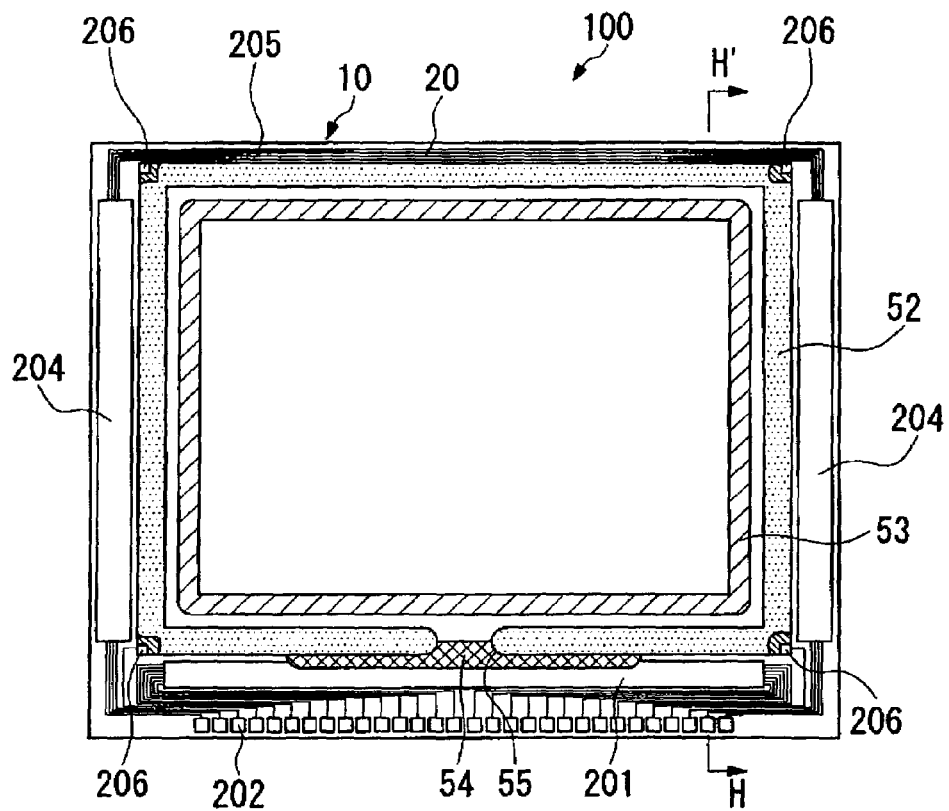
FIG. 1 is a plan view of a liquid crystal display device of an embodiment according to the present invention.
Figure 2:
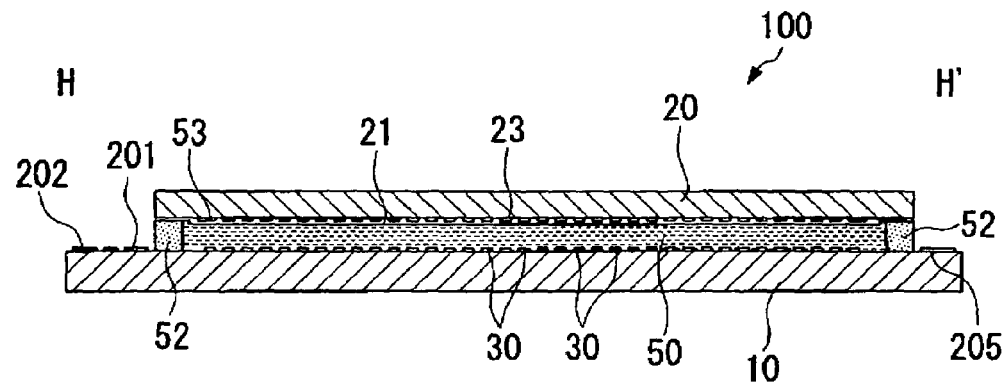
FIG. 2 is a sectional view taken along line H–H' of FIG. 1.

FIG. 1 is a plan view of a liquid crystal display device including liquid crystal as electro-optical material as an embodiment of the electro-optical device according to the present invention, viewed from an opposing substrate with relevant components. FIG. 2 is a sectional view taken along line H–H' of FIG. 1.

Figure 3:
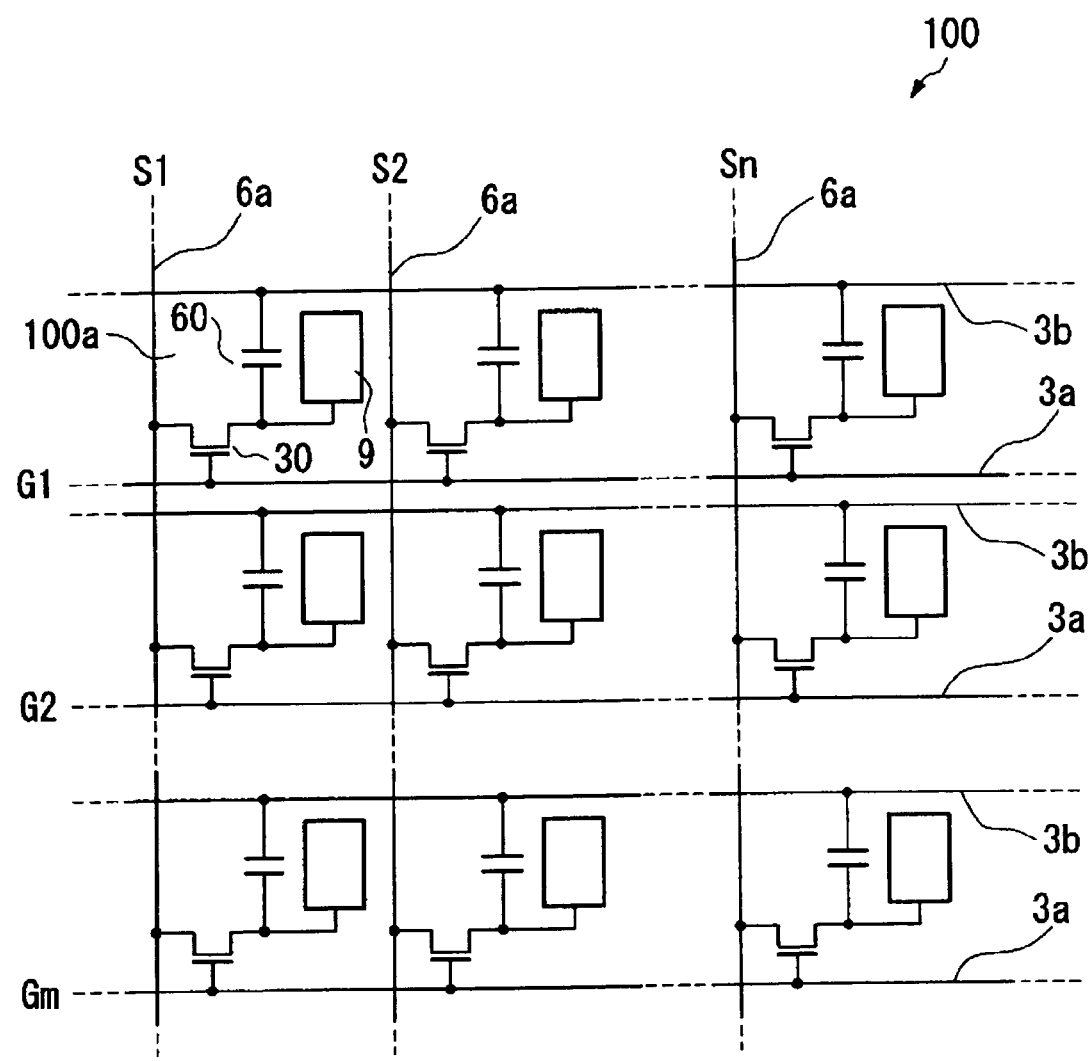
FIG. 3 is an equivalent circuit diagram of the liquid crystal display device of FIG. 1.
Figure 4:
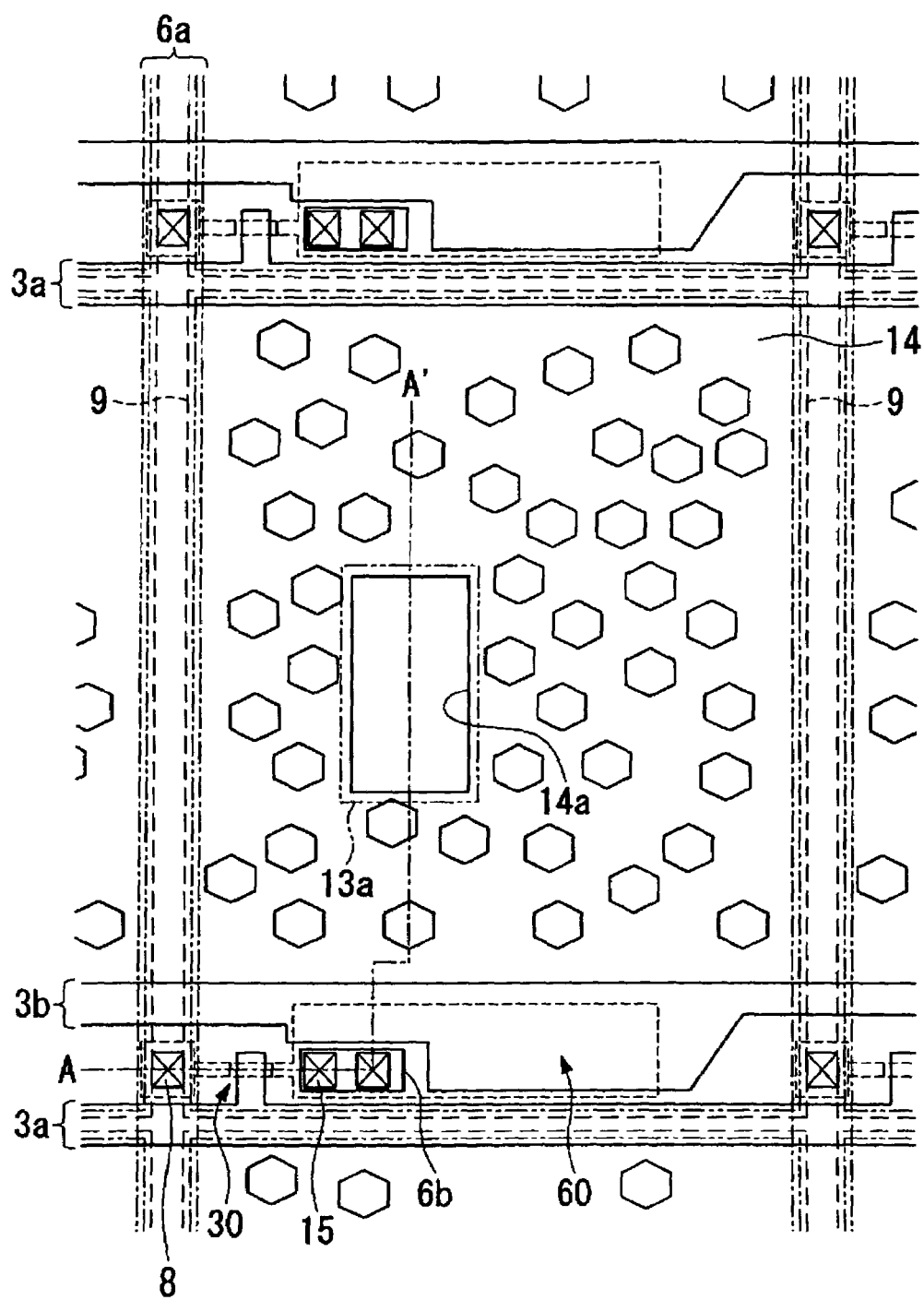
FIG. 4 is an enlarged plan view of a pixel of the liquid crystal display device.
Figure 5:
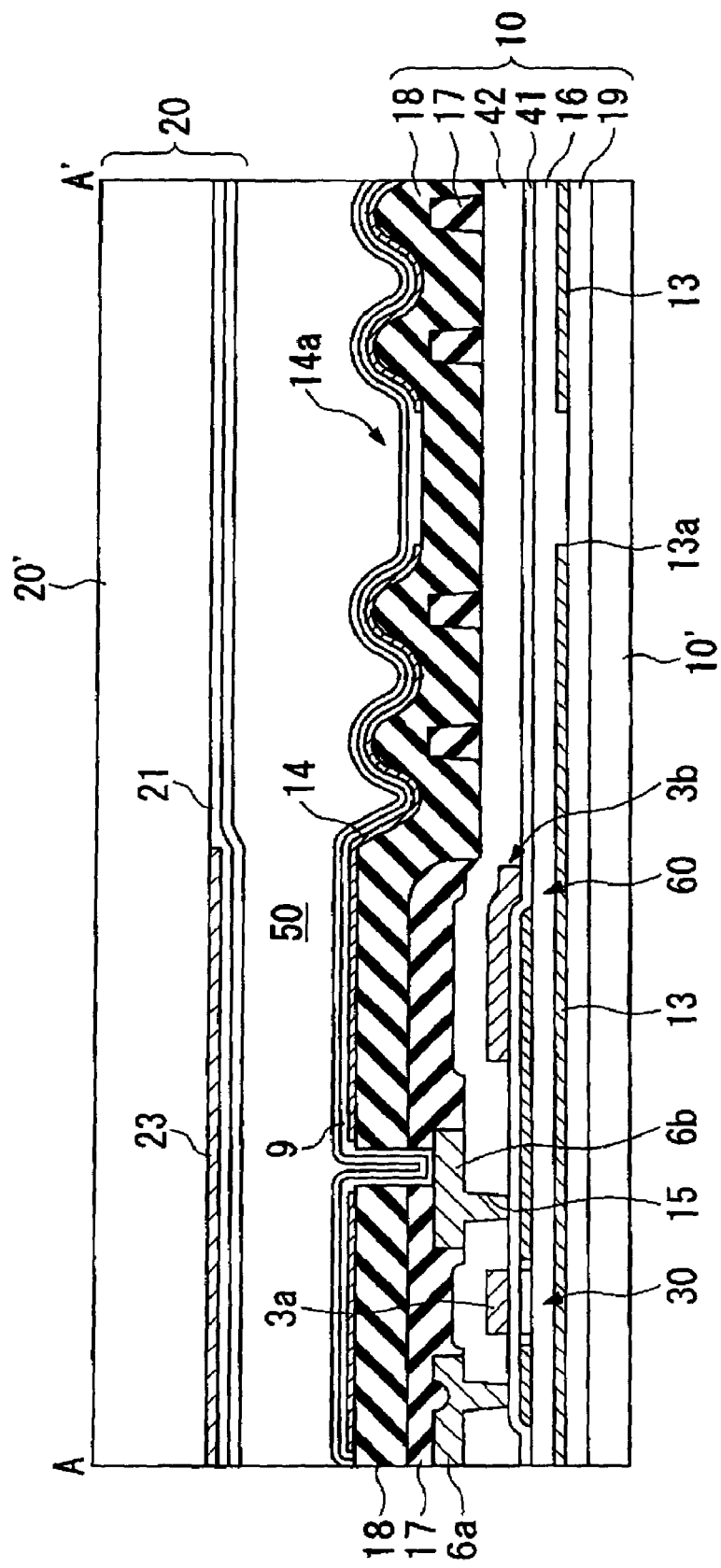
FIG. 5 is a sectional view taken along line A–A' of FIG. 4.

FIG. 3 is an equivalent circuit diagram showing types of parts and lines in pixels arranged in a matrix in an image display region of the liquid crystal display device. FIG. 4 is an enlarged sectional view of the structure of a pixel in the liquid crystal display device, shown in plan view. FIG. 5 is a sectional view taken along line A–A' of FIG. 4.

In the drawings that will be used for the descriptions below, the parts and layers are shown at different scales so that the parts and the layers are illustrated large enough to be recognizable in the drawings.

Referring to FIG. 1 and FIG. 2, a liquid crystal display device 100 of this embodiments can include a TFT-array substrate 10 and an opposing substrate 20 which are bonded together by a sealant 52. Liquid crystal 50 is injected to and retained in an area surrounded by the sealant 52. The sealant 52 is provided with a liquid-crystal inlet 55 for injecting the liquid crystal 50 after the bonding of the TFT-array substrate 10 and the opposing substrate 20 in the fabrication process. The liquid-crystal inlet 55 is sealed by a sealing piece 54 after the injection of the liquid crystal 50.

The inner region surrounded by the sealant 52 is provided with a peripheral partition 53 made of shielding material. In the region outside the sealant 52, a data-line driving circuit 201 and mounting terminals 202 are formed along a first edge of the TFT-array substrate 10. Scanning-line driving circuits 204 are formed along second and third edges which are adjacent to the first edge. Lines 205 are formed along the remaining edge, that is, a fourth edge of the TFT-array substrate 10. The lines 205 connect the two scanning-line driving circuits 204 provided on opposite sides of the image display region. For electrical connection between the TFT-array substrate 10 and the opposing substrate 20, a substrate connector 206 is formed in at least one corner of the opposing substrate 20.

As an alternative to the data-line driving circuit 201 and the scanning-line driving circuits 204 on the TFT-array substrate 10, a tape-automated-bonding (TAB) substrate having a large-scale integration (LSI) chip mounted thereon for driving and terminals provided in the peripheries of the TFT-array substrate 10 may be electrically and mechanically connected with each other via an anisotropic conductive film. In the liquid crystal display device 100, a retardation film and a polarizer, not shown in the drawings, are disposed at predetermined positions according to the type of liquid crystal 50 used, namely, a twisted nematic (TN) type or a super-twisted nematic (STN) type, or according to the driving mode, namely, a normally white mode or a normally black mode. If the liquid crystal display device 100 is a color display, each region of the opposing substrate 20 facing the corresponding pixel electrode described later of the TFT-array substrate 10 is provided with, for example, red (R), green (G), and blue (B) color filters formed together with the protective film.

Referring to FIG. 3, in the image display region of the liquid crystal display device 100 having the above structure, pixels 100a are arranged in a matrix. Each of the pixels 100a has a semiconductor element for pixel switching, that is, a thin film transistor (TFT) 30. Data lines 6a that supply pixel signals S1, S2, . . . , Sn are electrically connected to the sources of the TFTs 30. The pixel signals S1, S2, . . . , Sn written onto the data lines 6a may be supplied sequentially in this order, or may be supplied to groups of adjacent data lines 6a. Gates of the TFTs 30 are electrically connected to scanning lines 3a. Pulsed scanning signals G1, G2, . . . , Gm are applied in this order to the scanning lines 3a at a predetermined timing.

Pixel electrodes 9 are electrically coupled to drains of the TFTs 30. By setting the TFTs 30, which are switching elements, in an ON mode for a certain period of time, the pixel signals S1, S2, . . . , Sn supplied from the data lines 6a are written onto the pixels at a predetermined timing. The pixel signals S1, S2, . . . , Sn of the predetermined level written onto the liquid crystal 50 via the pixel electrodes 9 are stored between the pixel electrodes 9 and opposing electrodes 21 of the opposing substrate 20 in FIG. 2 for a certain period of time. To prevent the pixel signals S1, S2, . . . , Sn from leaking, a storage capacitor 60 can be provided in parallel with a liquid crystal capacitor formed between each pixel electrode 9 and the opposing electrode 21. For example, the storage capacitor 60 stores the voltage of the pixel electrode 9 for a period of several hundreds times the application time of the source voltage. This improves the storing properties of the electric charge to achieve a liquid crystal display device 100 with a high contrast ratio.

FIG. 4 is a schematic plan view of a pixel region which includes one of the pixel electrodes 9 of the liquid crystal display device 100. As indicated with a dashed line, the pixel electrode 9 covers the entire pixel region surrounded by the data lines 6a and the scanning lines 3a such that the four edges of the pixel electrode 9 overlap with the data lines 6a and the scanning lines 3a. In each pixel, a reflective plate 14 is formed under (adjacent to a glass substrate 10' in FIG. 5) the pixel electrode 9. The reflective plate 14 has predetermined openings 14a which serve as transmissive display regions, whereas non-opening regions function as reflective display regions.

FIG. 5 is an enlarged schematic view taken along line A–A' of FIG. 4. The liquid crystal display device 100 of this embodiment includes the TFT-array substrate 10 and the opposing substrate 20 holding the liquid crystal 50 therebetween. At the side of the liquid crystal 50 remote from the TFT-array substrate 10, a light source (not shown in the drawing) is provided that emits light for transmissive display. Natural light, such as sunlight or illuminating light incident on the side of the liquid crystal 50 remote from the opposing substrate 20 is used for reflective display.

The TFT-array substrate 10 composed of the glass substrate 10' as the main component can include the reflective plate 14 formed of a metallic reflective film mainly including aluminum (Al), and transparent electrodes mainly including indium tinoxide (ITO) to form a matrix of pixel electrodes 9 in plan view (see FIG. 4). Each of the pixel electrodes 9 is electrically connected with the TFT 30 (see FIG. 4) for pixel switching. As shown in FIG. 4, the data lines 6a, the scanning lines 3a, and a capacitor line 3b are formed substantially along the vertical and horizontal borders of the region occupied by the pixel electrode 9. The TFT 30 is connected with the data lines 6a and the scanning lines 3a. In other words, each data line 6a is electrically connected with a high-density source region of the TFT 30 via a contact hole 8. The pixel electrode 9 is electrically connected with a high-density drain region of the TFT 30 via a contact hole 15 and a drain electrode 6b.

The reflective plate 14 is formed under the pixel electrode 9 (adjacent to the glass substrate 10'). The reflective plate 14 is not formed in the drain electrode 6b region so that the pixel electrode 9 and the drain electrode 6b can be connected. On the other hand, the reflective plate 14 may be formed over the pixel electrode 9. In such a case, when the reflective plate 14 of aluminum (or an aluminum metal alloy) is formed, the contact between the pixel electrode 9 and the reflective plate 14 is surely achieved by providing a barrier metal (such as Mo) therebetween. The top surface of the pixel electrode 9 has an alignment film (not shown in the drawing) formed by rubbing a film mainly composed of polyimide.

In the opposing substrate 20, a black matrix 23 can be formed on the inner surface of the glass substrate 20' in regions that face the regions within the vertical and horizontal borders of the pixel electrodes 9 on the TFT-array substrate 10. The opposing electrode 21 composed of an ITO film is formed on the inner surface of the black matrix 23. Furthermore, the inner surface of the opposing electrode 21 has an alignment film (not shown in the drawing) formed by rubbing a film mainly composed of polyimide. The TFT-array substrate 10 and the opposing substrate 20 are bonded together with the sealant 52 (see FIG. 1). The liquid crystal 50 is injected and retained in the area surrounded by the sealant 52.

The structure of the TFT-array substrate 10 will now be described. The TFT-array substrate 10 includes an insulation film 19 mainly composed of silicon dioxide ($SiO_2$) on the glass substrate 10', and a light-shielding layer 13 mainly composed of either titanium (Ti), tantalum (Ta), tungsten (W), molybdenum (Mo), or chromium (Cr) on the insulation film 19. The light-shielding layer 13 is provided with openings 13a which correspond to the openings 14a of the reflective plate 14. In other words, the openings 13a correspond to the transmissive display regions, whereas the light-shielding layer 13 corresponds to the reflective display regions. As shown in FIG. 4, the alignment of one of the openings 13a of the light-shielding layer 13 (shown with a chain double-dashed line) and an opening 14a of the reflective plate 14 (shown with a continuous line) is designed to have an accuracy of about ±1 μm. In detail, the opening 13a of the light-shielding layer 13 is formed larger than the opening 14a of the reflective plate 14 within a range of 1 μm. The insulation film 19 between the light-shielding layer 13 and the glass substrate 10' protects the glass substrate 10' from damage caused by the photolithography process of patterning onto the light-shielding layer 13, and prevents deposits from adhering on the glass substrate 10'.

The TFTs 30 are formed on an insulation film 16 having a thickness of about 500 nm on the light-shielding layer 13. Because the TFTs 30 are formed on the light-shielding layer 13, the TFT 30 are protected from light emitted from the light source adjacent to the glass substrate 10'. For example, light leakage does not occur in the channel regions of the TFTs 30. An insulation film 17 and an insulation film 18 having an irregular surface are also formed on the TFTs 30. The reflective plate 14 and the pixel electrodes 9 are formed on the insulation film 18. The reflective plate 14 has an irregular surface which corresponds to that of the insulation film 18. Accordingly, light reflected by the reflective plate 14 is scattered to widen the viewing angle of the reflective display, thereby improving the display quality.

In the liquid crystal display device 100 of this embodiment, the TFTs 30 may be formed by, for example, a low-temperature process. In such a case, an amorphous semiconductor layer is formed over the glass substrate 10', and the layer is processed with laser radiation to crystallize it. In such a crystallization process by laser radiation, the crystallinity is efficiently improved by the laser radiation on the amorphous semiconductor layer from the side distant from the glass substrate 10'. This is because the laser beam not absorbed by the amorphous semiconductor layer is reflected by the light-shielding layer 13 and is re-radiated onto the amorphous semiconductor layer. In this case, the light-shielding layer 13 is formed not only over the TFT 30 regions, but also in the reflective display regions, thereby efficiently improving the reflection of the laser beam.

The light-shielding layer 13 is mainly composed of, for example, titanium (Ti) and is formed substantially over the entire reflective display regions. Accordingly, compared with having the light-shielding layers 13 only in the TFT 30 regions, prevention of, for example, static electricity is effectively improved. Thus, problems in the orientation of the liquid crystal 50 caused by, for example, static electricity is prevented to achieve a further improved operation of the liquid crystal display device 100.

A fabrication process of the liquid crystal display device 100 will now be described with reference to FIG. 5. Here, the fabrication process will be described particularly with reference to the formation steps of the TFTs 30. The insulation film 19 is first formed on the glass substrate 10' (first insulation layer formation step), and the light-shielding layer 13 mainly composed of, for example, titanium (Ti) is then formed over the entire insulation layer 19. The openings 13a corresponding to the transmissive display regions, that is, in predetermined regions on the light-shielding layer 13, are then formed by photolithography (light-shielding layer formation step).

The amorphous semiconductor layer is then formed on the insulation film 16 on the light-shielding layer 13 (amorphous semiconductor layer formation step). The amorphous semiconductor layer is crystallized by laser radiation from the side remote from the light-shielding layer 13 (laser radiation step). In such a case, the laser beam not absorbed by the amorphous semiconductor layer is reflected by the light-shielding layer 13 to enhance the laser radiation effect.

The crystallized semiconductor layer is then patterned according to the shape of an active layer formed by photolithography. The crystallized semiconductor layer is then coated with a gate insulation film 41 so that gate electrodes 3a are formed thereon in a predetermined pattern (gate insulation film formation step and gate electrode formation step). By masking the gate electrodes 3a, low-density impurity ions (phosphorus ions) are implanted into other regions to form low-density source regions and low-density drain regions for the gate electrodes 3a in a self-aligning way. The regions directly below the gate electrodes 3a, which is not doped with the impurity ions, functions as the channel regions.

By forming a resist mask (not shown in the drawings) wider than the gate electrodes 3a, high-density source regions and high-density drain regions are formed by implantation of high-density impurity ions (phosphorus ions). An interlayer insulation film 42 composed of, for example, silicon oxide is deposited on the top surface of the gate electrodes 3a by chemical vapor deposition (CVD). Regions of the interlayer insulation film 42 corresponding to the high-density source regions and the high-density drain regions are then etched to form the contact holes 8 and 15.

The entire insulation interlayer 42 is covered by sputtering, with a conductive material composed of aluminum, titanium, titanium nitride, tantalum, molybdenum, or a metal alloy mainly including one of the above metals, and is patterned by photolithography to form source electrodes 6a and drain electrodes 6b having a thickness of 400 to 800 nm. Accordingly, n-channel polycrystalline silicon TFTs 30 (semiconductor elements) are fabricated (p-channel TFTs may be fabricated by implantation of boric ions as an impurity).

The insulation film 17 and the insulation film 18 having an irregular surface are then formed by, for example, embossing. The reflective plate 14 having the openings 14a with a predetermined pattern is then formed on the insulation film 18. Through-holes are formed in the insulation films 17 and 18 for connection with the drain electrodes 6b. The pixel electrodes 9 connected with the drain electrodes 6b via the through-holes is then formed according to a predetermined pixel pattern.

On the other hand, the opposing substrate 20 including the black matrix 23 and the opposing electrodes 21 on the glass substrate 20' is prepared. The opposing substrate 20 and the TFT-array substrate 10 including the reflective plate 14 and the pixel electrodes 9 are bonded together with the sealant 52 (see FIG. 1). Liquid crystal 50 is injected into an area surrounded by the sealant 52 to form a liquid crystal panel. By providing a predetermined polarizer on the outer surface of the liquid crystal panel, the liquid crystal display device 100 of this embodiment is completed.

If the liquid crystal display device 100 is a color display, each region of the opposing substrate 20 facing the corresponding pixel electrodes of the TFT-array substrate 10 is provided with, for example, red (R), green (G), and blue (B) color filters. In such a case, the color filters are disposed between the opposing electrodes 21 and the glass substrate 20', or on the side of the opposing electrodes 21 distant from the glass substrate 20'. If the color filters are disposed between the opposing electrodes 21 and the glass substrate 20', a protective film may be provided, if required.

A modification of the liquid crystal display device will now be described.

Figure 6:
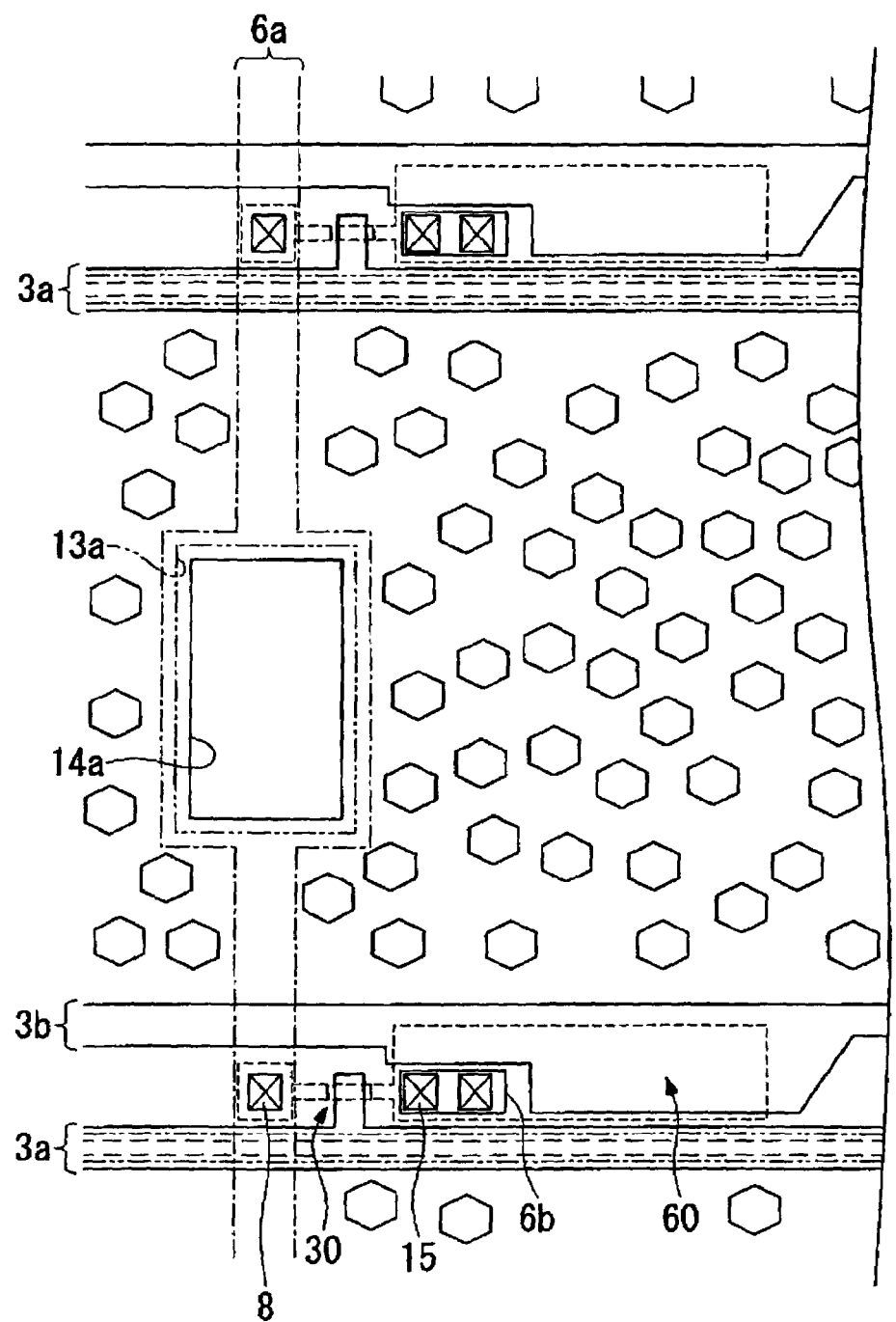
FIG. 6 is a plan view of a modification of the liquid crystal display device.

FIG. 6, which corresponds to FIG. 4, is a schematic plan view of the liquid crystal display device according to the modification. Among the data lines 6a and the scanning lines 3a connected with the TFTs 30, one data line 6a of a metallic conductive film composed of, for example, aluminum is provided below a pixel electrode 9. In other words, the data line 6a is covered with the pixel electrode 9 to avoid contact with the opening 13a of the light-shielding layer 13 (or the opening 14a of the reflective plate 14).

Consequently, the data line 6a of metallic conductive film composed of, for example, aluminum is provided below the reflective plate 14 (adjacent to the glass substrate 10'). Thus, light is not reflected at the data line 6a. This can eliminate the need for forming, for example, the black matrix 23 in the data line 6a region. In the liquid crystal display device having the structure shown in FIG. 6, in plan view, the structure of the light-shielding layer 13 is similar to that of the above-mentioned liquid crystal display device 100 and also has similar effects.

In this modification, as in the above-mentioned embodiment, the opposing substrate 20 may be provided with color filters to be used in a color liquid crystal display device.

Examples of electronic apparatuses having the liquid crystal display device according to any one of the above-mentioned embodiments will now be described.

Figure 7:
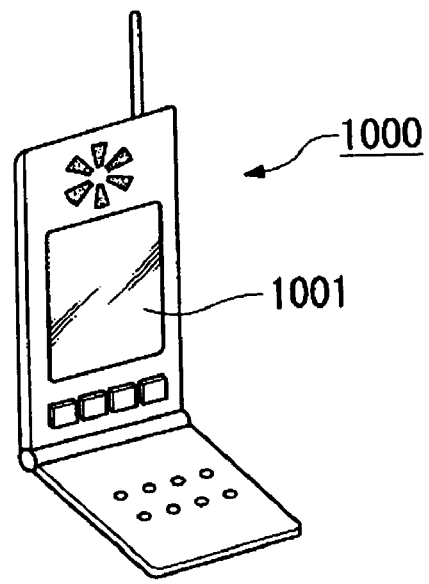
FIG. 7 is a perspective view of an example of an electronic apparatus according to the present invention.

FIG. 7 is a perspective view of a cellular phone. Reference numeral 1000 indicates a cellular phone body and reference numeral 1001 indicates a liquid crystal display unit which includes the liquid crystal display device of the above-mentioned embodiments.

Figure 8:
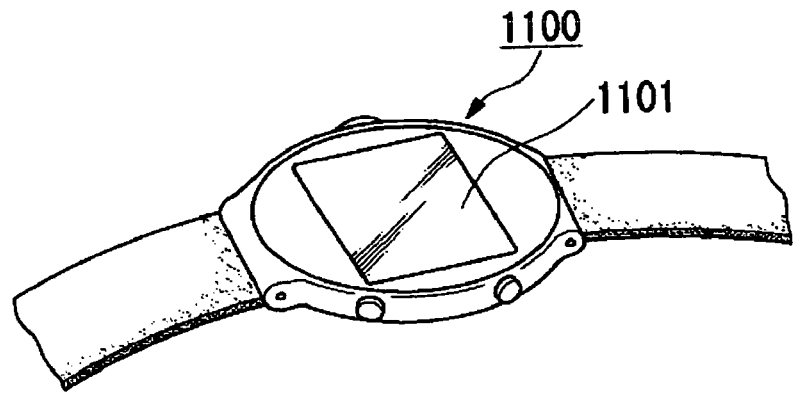
FIG. 8 is a perspective view of another example of an electronic apparatus according to the present invention.

FIG. 8 is a perspective view of a wristwatch electronic apparatus. Referring to FIG. 8, reference numeral 1100 indicates a watch body and reference numeral 1101 indicates the liquid crystal display unit which includes the liquid crystal display device of the above embodiments.

Figure 9:
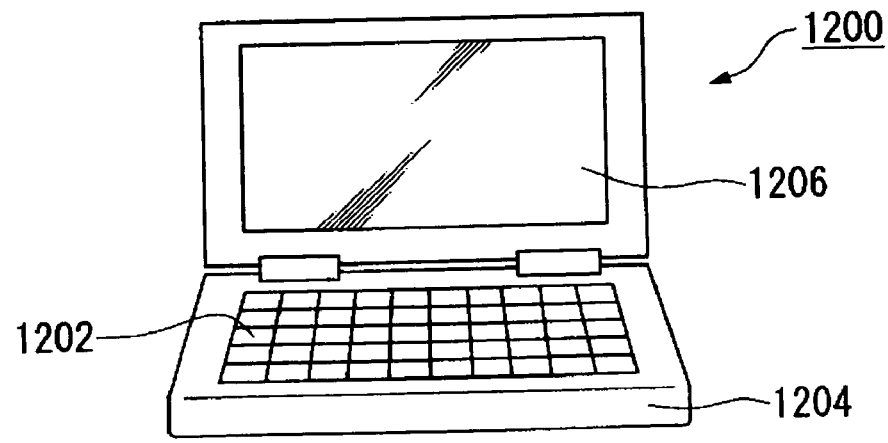
FIG. 9 is a perspective view of another example of an electronic apparatus according to the present invention.

FIG. 9 is a perspective view of a portable information processing apparatus, such as a word processor or a personal computer. Referring to FIG. 9, reference numeral 1200 indicates a portable information processing apparatus, reference numeral 1202 indicates an input unit such as a keyboard, reference numeral 1204 indicates an information processing body, and reference numeral 1206 indicates the liquid crystal display unit which includes the liquid crystal display device of the above embodiments.

Each of the electronic apparatuses in FIGS. 7 to 9 includes one of the liquid crystal display devices according to the above embodiments. Hence, these electronic apparatuses are highly reliable and have high display quality.

As described above, in the electro-optical device of the present invention, a light-shielding layer that shields semiconductor elements from light has openings which are formed in substantially the same regions in which openings of a reflective plate are formed. Consequently, the regions with the openings are the transmissive regions, whereas the regions without the openings are the reflective regions. Compared with having the light-shielding layer only in the semiconductor element regions, the present invention can prevent unevenness of the distance between two substrates caused by the formation of the light-shielding layer.

While this intervention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. An electro-optical device, comprising:
   an electro-optical material disposed between an element substrate having pixel electrodes and an opposing substrate facing the element substrate,
   the element substrate including semiconductor elements that drive the pixel electrodes, insulation films covering the semiconductor elements, and a reflective plate disposed on the insulation films, the reflective plate having openings,
   each of the semiconductor elements adjacent to the element substrate having a light-shielding layer disposed on another insulation film, the another insulation film formed on the element substrate, the light-shielding layer shielding the semiconductor element from incident light, the light-shielding layer formed substantially over entire reflective display regions of the device and having openings only in substantially the same regions as those of the openings in the reflective plate.

2. The electro-optical device according to claim 1, each of the semiconductor elements being coupled with a source line and a gate line, the source line being covered by one of the pixel electrodes to avoid contact with one of the openings of the light-shielding layer.

3. An electronic apparatus comprising the electro-optical device according to claim 1.

* * * * *